United States Patent
Jiang et al.

(10) Patent No.: US 12,299,538 B2
(45) Date of Patent: May 13, 2025

(54) PREPARING SUPERPOSITIONS OF COMPUTATIONAL BASIS STATES ON A QUANTUM COMPUTER

(71) Applicant: Google LLC, Mountain View, CA (US)

(72) Inventors: Zhang Jiang, El Segundo, CA (US); Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 1166 days.

(21) Appl. No.: 17/257,895

(22) PCT Filed: Jul. 3, 2019

(86) PCT No.: PCT/US2019/040518
§ 371 (c)(1),
(2) Date: Jan. 5, 2021

(87) PCT Pub. No.: WO2020/010208
PCT Pub. Date: Jan. 9, 2020

(65) Prior Publication Data
US 2021/0271477 A1    Sep. 2, 2021

Related U.S. Application Data
(60) Provisional application No. 62/694,850, filed on Jul. 6, 2018.

(51) Int. Cl.
| | |
|---|---|
| *G06N 10/60* | (2022.01) |
| *G06F 9/30* | (2018.01) |
| *G06N 10/20* | (2022.01) |

(52) U.S. Cl.
CPC ......... *G06N 10/60* (2022.01); *G06F 9/30101* (2013.01); *G06N 10/20* (2022.01)

(58) Field of Classification Search
CPC .............................. G06N 10/00; G06N 10/20
See application file for complete search history.

(56) References Cited

PUBLICATIONS

Babbush, "Encoding Electronic Spectra in Quantum Circuits with Linear T Complexity", 2018 (Year: 2018).*
Ruiz-Perez, "Quantum arithmetic with the quantum Fourier transform", 2017 (Year: 2017).*

(Continued)

*Primary Examiner* — Van C Mang
(74) *Attorney, Agent, or Firm* — Fish & Richardson P.C.

(57) ABSTRACT

Methods, systems and apparatus for preparing arbitrary superposition quantum states of a quantum register on a quantum computer, the quantum state comprising a superposition of L computational basis states. In one aspect, a register of log L qubits is prepared in a weighted sum of register basis states, where each register basis state indexes a corresponding quantum state computational basis state, and the amplitude of each register basis state in the weighted sum of register basis states is equal to the amplitude of the corresponding computational basis state in the superposition of L computational basis states. A unitary transformation that maps the register basis states to the corresponding L computational basis states is then implemented, including, for each index 1 to L, controlling, by the register of log L qubits, transformation of the quantum system register state for the index to the corresponding computational basis state for the index.

24 Claims, 7 Drawing Sheets

(56) References Cited

PUBLICATIONS

Office Action in Canada Appln. No. 3,156,724, dated Jun. 9, 2023, 6 pages.

Office Action in Canadian Appln. No. 3,102,290, dated Aug. 22, 2022, 5 pages.

Notice of Allowance in Australian Appln. No. 2023203463, mailed on Oct. 13, 2023, 3 pages.

EP Office Action in European Appln. No. 19745436.6, dated Sep. 23, 2022, 5 pages.

CA Office Action in Canadian Appln. No. 3,102,290, dated Aug. 22, 2022, 5 pages.

Notice of Allowance in Canadian Appln. No. 3,102,290, dated Jun. 8, 2023, 1 page.

Notice of Allowance in European Appln. No. 19745436.6, dated Jun. 21, 2023, 9 pages.

Office Action in Australian Appln. No. 2021240206, dated Jul. 28, 2022, 3 pages.

Abrams et al., "Full configuration interaction potential energy curves for the X $1 \Sigma$ g+, B $1 \Delta$ g, and B' $1 \Sigma$ g$^+$ states of C 2: A challenge for approximate methods," The Journal of Chemical Physics, Nov. 2004, 121(19):9211-9.

Abrams et al., "Quantum algorithm providing exponential speed increase for finding eigenvalues and eigenvectors," Physical Review Letters, Dec. 1999, 83(24):5162.

Abrams et al., "Simulation of many-body Fermi systems on a universal quantum computer," Physical Review Letters, Sep. 1997, 79(13):2586.

Acharya et al., "Metal-insulator transition in copper oxides induced by apex displacements," Physical Review, May 2018, 8(2):021038.

Aspuru-Guzik et al., "Simulated quantum computation of molecular energies," Science, Sep. 2005, 309(5741):1704-7.

Babbush et al., "Adiabatic quantum simulation of quantum chemistry," Scientific Reports, Oct. 2014, 4(1):1-1.

Babbush et al., "Encoding electronic spectra in quantum circuits with linear T complexity," Physical Review, Oct. 2018, 8(4):041015.

Babbush et al., "Low-depth quantum simulation of materials," Physical Review X, Mar. 2018, 8(1):011044.

Bartlett et al., "Alternative coupled-cluster ansätze II. The unitary coupled-cluster method," Chemical Physics Letters, Feb. 1989, 155(1):133-40.

Bauer et al., "Hybrid quantum-classical approach to correlated materials," Physical Review X, Sep. 2016, 6(3):031045.

Bender et al., "Studies in configuration interaction: The first-row diatomic hydrides," Physical Review, Jul. 1969, 183(1):23.

Bernu et al., "Hartree-Fock phase diagram of the two-dimensional electron gas," Physical Review, Sep. 2011, 84(11):115115.

Berry et al., "Improved techniques for preparing eigenstates of fermionic Hamiltonians," npj Quantum Information, May 2018, 4(1):1-7.

Brown et al., "Path-integral Monte Carlo simulation of the warm dense homogeneous electron gas," Physical Review Letters, Apr. 2013, 110(14):146405.

Buenker et al., "Applicability of the multi-reference double-excitation CI (MRD-CI) method to the calculation of electronic wavefunctions and comparison with related techniques," Molecular Physics, Mar. 1978, 35(3):771-91.

Ceperley et al., "Ground state of the electron gas by a stochastic method," Physical Review Letters, Aug. 1980, 45(7):566.

Childs et al., "Toward the first quantum simulation with quantum speedup," Proceedings of the National Academy of Sciences, Sep. 2018, 115(38):9456-61.

Cody Jones et al., "Faster quantum chemistry simulation on fault-tolerant quantum computers," New Journal of Physics, 2012, 14(11).

Colless et al., "Computation of molecular spectra on a quantum processor with an error-resilient algorithm," Physical Review X, Feb. 2018, 8(1):011021.

Coulson et al., "Notes on the molecular orbital treatment of the hydrogen molecule," The London, Edinburgh, and Dublin Philosophical Magazine and Journal of Science, Apr. 1949, 40(303):386-93.

Dallaire-Demers et al., "Low-depth circuit ansatz for preparing correlated fermionic states on a quantum computer," CoRR, Jan. 2018, arXiv:1801.01053, 15 pages.

Dreuw et al., "Single-reference ab initio methods for the calculation of excited states of large molecules," Chemical Reviews, Nov. 2005, 105(11):4009-37.

Dunning et al., "Gaussian basis sets for use in correlated molecular calculations—The atoms boron through neon and hydrogen," The Journal of Chemical Physics, Jan. 1989, 90(2):1007-23.

Ehlers et al., "Hybrid-space density matrix renormalization group study of the doped two-dimensional Hubbard model," Physical Review, Mar. 2017, 95(12):125125.

Feller et al., "A survey of factors contributing to accurate theoretical predictions of atomization energies and molecular structures," The Journal of Chemical Physics, 2008, 129(20), 204105.

Feynman et al., "Simulating physics with computers," Int. J. Theor. Phys., 1982, 21(6/7).

Gan et al., "Calibrating quantum chemistry: A multi-teraflop, parallel-vector, full-configuration interaction program for the Cray-X1," Proceedings of the ACM/IEEE SC 2005 Conference, 2005, 22-22.

Gan et al., "The lowest energy states of the group-IIIA-group-VA heteronuclear diatomics: BN, BP, AlN, and AlP from full configuration interaction calculations," The Journal of Chemical Physics, Sep. 2006, 125(12):124311.

Ge et al., "Faster ground state preparation and high-precision ground energy estimation with fewer qubits," Journal of Mathematical Physics, Feb. 2019, 60(2):022202.

Georges et al., "Dynamical mean-field theory of strongly correlated fermion systems and the limit of infinite dimensions," Reviews of Modern Physics, Jan. 1996, 68(1):13.

Gull et al., "Momentum-space anisotropy and pseudogaps: A comparative cluster dynamical mean-field analysis of the doping-driven metal-insulator transition in the two-dimensional Hubbard model," Physical Review B, Oct. 2010, 82(15):155101.

Gwaltney et al., "A perturbative correction to the quadratic coupled-cluster doubles method for higher excitations," Chemical Physics Letters, Feb. 2002, 353(5-6):359-67.

Hait et al., "How accurate is density functional theory at predicting dipole moments? An assessment using a new database of benchmark values," Journal of Chemical Theory and Computation, Mar. 2018, 14(4):1969-81.

Hait et al., "Prediction of excited-state energies and singlet-triplet gaps of charge-transfer states using a restricted open-shell Kohn-Sham approach," Journal of Chemical Theory and Computation, Jul. 2016, 12(7):3353-9.

Hamilton et al., "Direct inversion in the iterative subspace (DIIS) optimization of open-shell, excited-state, and small multiconfiguration SCF wave functions," The Journal of Chemical Physics, May 1986, 84(10):5728-34.

Huron et al., "Iterative perturbation calculations of ground and excited state energies from multiconfigurational zeroth-order wavefunctions," The Journal of Chemical Physics, Jun. 1973, 58(12):5745-59.

Hwang et al., "Emergence of Kondo resonance in graphene intercalated with cerium," Nano Letters, May 2018, 18(6):3661-6.

Illas et al., "Selected versus complete configuration interaction expansions," The Journal of Chemical Physics, Aug. 1991, 95(3):1877-83.

Jiang et al., "Quantum algorithms to simulate many-body physics of correlated fermions," Physical Review Applied, Apr. 2018, 9(4):044036.

Kitaev et al., "Quantum measurements and the Abelian stabilizer problem," arXiv preprint quant-ph/9511026, Nov. 1995, 22 pages.

Kivlichan et al., "Quantum simulation of electronic structure with linear depth and connectivit," Physical review letters, Mar. 2018, 120(11):110501.

Kohn et al., "Nobel Lecture: Electronic structure of matter—wave functions and density functionals," Reviews of Modern Physics, Oct. 1999, 71(5):1253.

(56) References Cited

PUBLICATIONS

Kotliar et al., "Cellular dynamical mean field approach to strongly correlated systems," Physical Review Letters, Oct. 2001, 87(18):186401.
Kowalczyk et al., "Assessment of the ΔSCF density functional theory approach for electronic excitations in organic dyes," The Journal of Chemical Physics, Feb. 2011, 134(5):054128.
Kowalczyk et al., "Excitation energies and Stokes shifts from a restricted open-shell Kohn-Sham approach," The Journal of Chemical Physics, Apr. 2013, 138(16):164101.
Lanyon et al., "Towards quantum chemistry on a quantum computer," Nature Chemistry, Feb. 2010, 2(2):106-11.
Läuchli et al., "Ground-state energy and spin gap of spin-1 2 Kagomé-Heisenberg antiferromagnetic clusters: Large-scale exact diagonalization results," Physical Review B, Jun. 2011, 83(21):212401.
Low et al., "Hamiltonian simulation by qubitization," Quantum, Jul. 2019, 3:163.
Malone et al., "Accurate exchange-correlation energies for the warm dense electron gas," Physical Review Letters, Sep. 2016, 117(11):115701.
Mardirossian et al., "Thirty years of density functional theory in computational chemistry: an overview and extensive assessment of density functionals," Molecular Physics, Oct. 2017, 115(19):2315-72.
McClean et al., "Barren plateaus in quantum neural network training landscapes," Nature Communications, Nov. 2018, 9(1):1-6.
McClean et al., "Exploiting locality in quantum computation for quantum chemistry" The journal of physical chemistry letters, Dec. 2014, 5(24):4368-80.
McClean et al., "Hybrid quantum-classical hierarchy for mitigation of decoherence and determination of excited states," Physical Review A, Apr. 2017, 95(4):042308.
McClean et al., "The theory of variational hybrid quantum-classical algorithms," New Journal of Physics, Feb. 2016, 18(2):023023.
Mejuto-Zaera et al., "Dynamical mean field theory simulations with the adaptive sampling configuration interaction method," Physical Review, Sep. 2019, 100(12):125165.
O'Malley et al., "Scalable quantum simulation of molecular energies," Physical Review X, Jul. 2016, 6(3):031007.
Olivares-Amaya et al., "The ab-initio density matrix renormalization group in practice," The Journal of Chemical Physics, Jan. 2015, 142(3):034102.
Ortiz et al., "The challenge of quantum computer simulations of physical phenomena," Nuclear Physics B-Proceedings Supplements, Mar. 2002, 106:151-8.
PCT International Preliminary Report on Patentability in International Appln. No. PCT/US2019/040518, Jan. 21, 2021, 12 pages.
PCT International Search Report and Written Opinion in International Appln. No. PCT/US2019/040518, dated Oct. 18, 2019, 19 pages.
Perdew et al., Erratum: Accurate and simple analytic representation of the electron-gas correlation energy, Physical Review, Aug. 2018, 98(7):079904.
Peruzzo et al., "A variational eigenvalue solver on a photonic quantum processor," Nature communications, Jul. 2014, 5(1):1-7.
Piecuch et al., "Recent advances in electronic structure theory: Method of moments of coupled-cluster equations and renormalized coupled-cluster approaches," International Reviews in Physical Chemistry, Oct. 2002, 21(4):527-655.
Pople et al., "Gaussian-1 theory: A general procedure for prediction of molecular energies," The Journal of Chemical Physics, May 1989, 90(10):5622-9.
Poulin et al., "Quantum algorithm for spectral measurement with a lower gate count," Physical Review Letters, Jul. 2018, 121(1):010501.
Reiher et al., "Elucidating reaction mechanisms on quantum computers," Proceedings of the National Academy of Sciences, Jul. 2017, 114(29):7555-60.
Romero et al., "Strategies for quantum computing molecular energies using the unitary coupled cluster ansatz," Quantum Science and Technology, Oct. 2018, 4(1):014008.
Roth et al., "Importance truncation for large-scale configuration interaction approaches," Physical Review C, Jun. 2009, 79(6):064324.
Rubin et al., "A hybrid classical/quantum approach for large-scale studies of quantum systems with density matrix embedding theory," arXiv preprint arXiv:1610.06910, Oct. 2016, 10 pages.
Sakai et al., "Evolution of electronic structure of doped mott insulators: Reconstruction of poles and zeros of Green's function," Physical Review Letters, Feb. 2009, 102(5):056404.
Santagati et al., "Witnessing eigenstates for quantum simulation of Hamiltonian spectra," Science Advances, Jan. 2018, 4(1):eaap9646.
Sharma et al., "Semistochastic heat-bath configuration interaction method: Selected configuration interaction with semistochastic perturbation theory," Journal of Chemical Theory and Computation, Apr. 2017, 13(4):1595-604.
Shende et al., "Synthesis of quantum-logic circuits," IEEE Transactions on Computer-Aided Design of Integrated Circuits and Systems, May 2006, 25(6):1000-10.
Shepherd et al., "Investigation of the full configuration interaction quantum Monte Carlo method using homogeneous electron gas models," The Journal of Chemical Physics, Jun. 2012, 136(24):244101.
Sherrill et al., "The Configuration Interaction Method: Advances in Highly Correlated Approaches," Advances in Quantum Chemistry, 1999, pp. 143-269.
Sordi et al., "Strong coupling superconductivity, pseudogap, and mott transition," Physical Review Letters, May 2012, 108(21):216401.
Szalay et al., "Multiconfiguration self-consistent field and multireference configuration interaction methods and applications," Chemical Reviews, Jan. 2012, 112(1):108-81.
Takeshita et al., "Increasing the representation accuracy of quantum simulations of chemistry without extra quantum resources," Physical Review X, Jan. 2020, 10(1):011004.
Tubman et al., "A deterministic alternative to the full configuration interaction quantum Monte Carlo method," The Journal of Chemical Physics, Jul. 2016, 145(4):044112.
Tubman et al., "An efficient deterministic perturbation theory for selected configuration interaction methods," arXiv preprint arXiv:1808.02049, Aug. 2018, 13 pages.
Tubman et al., "Postponing the orthogonality catastrophe: efficient state preparation for electronic structure simulations on quantum devices," arXiv preprint arXiv:1809.05523, Sep. 2018, 13 pages.
Van Voorhis et al., "The quadratic coupled cluster doubles model," Chemical Physics Letters, Nov. 2000, 330(5-6):585-94.
Vittorio et al., "Quantum Rantdom Access Memory," Physical Review Letters, Apr. 2008, 100:16(21).
Vogiatzis et al., "Pushing configuration-interaction to the limit: Towards massively parallel MCSCF calculations," The Journal of Chemical Physics, Nov. 2017, 147(18):184111.
Vosko et al., "Accurate spin-dependent electron liquid correlation energies for local spin density calculations: a critical analysis," Canadian Journal of Physics, Aug. 1980, 58(8):1200-11.
Wang et al., "Quantum simulation of helium hydride cation in a solid-state spin register," ACS nano, Aug. 2015, 9(8):7769-74.
Ward et al., "Preparation of many-body states for quantum simulation," The Journal of Chemical Physics, May 2009, 130(19):194105.
Wecker et al., "Gate-count estimates for performing quantum chemistry on small quantum computers," Physical Review A, Aug. 2014, 90(2):022305.
Wecker et al., "Progress towards practical quantum variational algorithms," Physical Review A, Oct. 2015, 92(4):042303.
Wecker et al., "Solving strongly correlated electron models on a quantum computer," Physical Review A, Dec. 2015, 92(6):062318.
Whitfield et al., "Simulation of electronic structure Hamiltonians using quantum computers," Molecular Physics, Mar. 2011, 109(5):735-50.
Woon et al., "Gaussian basis sets for use in correlated molecular calculations—The atoms aluminum through argon," The Journal of Chemical Physics, Jan. 1993, 98(2):1358-71.
Wu et al., "Polynomial-time simulation of pairing models on a quantum computer," Physical Review Letters, Jul. 2002, 89(5):057904.
Ye et al., "σ-SCF: A direct energy-targeting method to mean-field excited states," The Journal of chemical physics, Dec. 2017, 147(21):214104.

(56) References Cited

PUBLICATIONS

Yung et al., "From transistor to trapped-ion computers for quantum chemistry," Scientific Reports, Jan. 2014, 4(1):1-7.
Zheng et al., "Stripe order in the underdoped region of the two-dimensional Hubbard model," Science, Dec. 2017, 358(6367):1155-60.
AU Office Action in Australian Appln. No. 2019297413, dated Jun. 15, 2021, 4 pages.
Office Action in Australian Appln. No. 2023203463, mailed on Sep. 12, 2023, 3 pages.
Office Action in Canadian Appln. No. 3,102,290, dated Nov. 26, 2021, 4 pages.
Extended European Search Report in European Appln. No. 23206819.7, mailed on Mar. 28, 2024, 10 pages.

\* cited by examiner

300

Prepare register of log L qubits in an initial weighted sum of register basis states, where each register basis state indexing a corresponding quantum system computational basis state and the amplitude of each register basis state in the weighted sum equals to amplitude of the corresponding quantum system computational basis state
302

Prepare quantum state by implementing unitary transformation that maps register basis states to quantum system computational basis states
304

FIG. 3

PREPARING SUPERPOSITIONS OF COMPUTATIONAL BASIS STATES ON A QUANTUM COMPUTER

CROSS-REFERENCE TO RELATED APPLICATION

This application is a National Stage Application under 35 U.S.C. § 371 and claims the benefit of International Application No. PCT/US2019/040518, filed Jul. 3, 2019, which claims priority to U.S. Application No. 62/694,850, filed Jul. 6, 2018, entitled PREPARING SUPERPOSITIONS OF COMPUTATIONAL BASIS STATES ON A QUANTUM COMPUTER, the disclosure of each of which is incorporated herein by reference.

BACKGROUND

This specification relates to quantum computing.

SUMMARY

This specification describes technologies for preparing an arbitrary superposition of computational basis states on a quantum computer.

In general, one innovative aspect of the subject matter described in this specification can be implemented in a method for preparing a quantum state of a quantum system register on a quantum computer, wherein the quantum state comprises a superposition of L computational basis states, the method comprising: preparing a register of log L qubits in an initial state, the initial state comprising a weighted sum of register basis states, wherein: each register basis state indexes a corresponding quantum state computational basis state, and the amplitude of each register basis state in the weighted sum of register basis states is equal to the amplitude of the corresponding computational basis state in the superposition of L computational basis states; and preparing the quantum state by implementing a unitary transformation that maps the register basis states to the corresponding L computational basis states, comprising, for each index 1 to L, controlling, by the register of log L qubits, transformation of the quantum system register state for the index to the corresponding computational basis state for the index.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations implementing a unitary transformation that maps the register basis states to the corresponding L computational basis states comprises implementing a unary iteration quantum circuit.

In some implementations controlling transformation of the quantum system register state for the index to the corresponding computational basis state for the index comprises controlling applications of unitary operators on the quantum system register state by a state of a unary register, wherein the state of the unary register is determined by the register of log L qubits.

In some implementations controlling applications of unitary operators on the quantum system register state by a state of a unary register comprises, for each index 1 to L: reading the computational basis state corresponding to the index to the quantum system register, comprising applying a unitary operator for the index to the system register controlled by the unary register; erasing the state of the register of log L qubits using a unitary operator controlled by the unary register; and uncomputing the unary register.

In some implementations the method further comprises providing the register of log L qubits for use in further computations.

In some implementations controlling applications of unitary operators on a system register encoding the quantum state by a unary register comprising the register of log L qubits comprises controlling applications of products of Pauli-X quantum logic gates.

In some implementations implementing a unitary transformation that maps the register basis states to the corresponding L computational basis states comprises applying select unitary methods.

In some implementations preparing the register of log L qubits in the initial state comprises applying quantum circuit synthesis techniques.

In some implementations the superposition of L computational basis states is determined using an adaptive sampling configuration interaction method.

In some implementations the method further comprises providing the quantum state for use in a quantum phase estimation algorithm.

In some implementations the method further comprises performing a quantum simulation using the prepared quantum state as an initial state of the quantum simulation.

In some implementations the quantum computer comprises a circuit model quantum computer.

Another innovative aspect of the subject matter described in this specification can be implemented in a method for preparing a target quantum state of a quantum system register on a quantum computer, wherein the target quantum state comprises a superposition of L computational basis states, the method comprising, sequentially for each index $l=1$ to $l=L$: preparing the quantum system register and a unary register in a quantum state, wherein: the state of the quantum system register is entangled with the unary register, at an initial time step the state of the quantum system register equals the target quantum state up to the first (l−1) computational basis states if the state of the unary register is $|0z,29$, and the state of the quantum system register equals the l-th computational basis state if the unary register is in state $|1\rangle$; selecting a qubit from the quantum system register whose value is different in the l-th computational basis state and the l+1-th computational basis state; applying a rotation to the selected qubit, wherein the rotation is controlled by the state of a unary register; erasing the unary register value for the l-th computational basis state; and implementing a NOT logic gate on the remaining qubits in the quantum system register whose values are different in the l-th computational basis state and the l+1-th computational basis state, wherein implementation of the NOT logic gate is controlled by the state of the unary register.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations preparing the quantum system register and a unary register in a quantum state comprises preparing the quantum system register and unary register in a quantum state $|\psi_l\rangle = \beta_l|D_l\rangle|1\rangle + \Sigma_{l'=1}^{l-1}\alpha_{l'}|D_{l'}\rangle|0\rangle$, wherein l represents the index, $|D_l\rangle$ represents the l-th computational basis state, $\alpha$ represents a computational basis state amplitude, and $$|\beta_l| = \sqrt{1 - \Sigma_{l'=1}^{l-1}|\alpha_{l'}|^2}.$$

In some implementations the method further comprises ordering the computational basis states such that the Hamming distances between neighboring computational basis states are reduced.

In some implementations applying a rotation to the selected qubit comprises applying a Pauli X gate to the selected qubit.

In some implementations selecting a qubit from the quantum system register whose value is different the l-th computational basis state and the l+1-th computational basis state comprises selecting a qubit from the quantum system whose occupation numbers $d_{l,k}$ and $d_{l+1,k}$ are different.

In some implementations the amplitude of the l-th basis state is derived from normalization.

In some implementations $|\beta_l|$ is derived from normalization.

In some implementations the superposition of L computational basis states is determined using an adaptive sampling configuration interaction method.

In some implementations the method further comprises providing the target quantum state for use in a quantum phase estimation algorithm.

In some implementations the method further comprises initializing a quantum simulation using the prepared target quantum state; and performing a the quantum simulation.

The subject matter described in this specification can be implemented in particular ways so as to realize one or more of the following advantages.

A system preparing quantum states using the techniques described in this specification can efficiently prepare superposition states of arbitrary size, since the cost of the quantum state procedure is, up to log factors, of O(L) where L represents the number of computational basis states. Since quantum state preparation is an essential component of many quantum computations and simulations, the presently filed subject matter thus increases the efficiency of such quantum computations and simulations. For example, phase estimation algorithms may be performed more efficiently and quantum simulations, e.g., of chemicals or materials, may be performed more efficiently.

In addition, systems implementing the techniques described in this specification may prepare larger superposition states at a same cost compared to other systems implementing conventional techniques. Since larger superposition states typically have a stronger support on target quantum states, this can increase the accuracy of quantum algorithms and computations that require the preparation of quantum states.

Near-term quantum computers can typically implement a limited number of reliable (e.g., high fidelity) quantum gates and therefore have limited computational power. Reducing the number of quantum gates used in the preparation of quantum computer quantum states can therefore free-up more of this limited computational power for performing quantum algorithms of interest. A system preparing quantum states using the techniques described in this specification can prepare superposition states using fewer T gates compared to other systems implementing conventional techniques. Since T gates are notoriously costly, a system preparing quantum states using the techniques described in this specification requires less computational resources compared to other systems implementing conventional techniques. In embodiments that utilise unary iteration techniques/circuits, the T-complexity (i.e. number of T-gates required) to produce superposition states can be further reduced.

In addition, a system preparing quantum states using the techniques described in this specification can prepare quantum states using a circuit that can be compiled more easily compared to systems using other techniques.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for preparing a superposition of basis states using a compressed register of qubits.

DETAILED DESCRIPTION

Techniques for preparing and studying ground states of quantum systems, e.g., molecular systems, on a quantum computer include applying a quantum phase estimation algorithm to project an initial guess state IV) onto the ground state. The quantum phase estimation algorithm enables the phase accumulated on a quantum register under the action of a unitary operator U to be measured. Some varieties of phase estimation, such as iterative phase estimations and phase estimations based on the quantum Fourier transform, perform this measurement protectively, enabling sampling in the eigenbasis of the unitary operator U. In the context of quantum simulation, this unitary operator usually corresponds to time evolution under the system Hamiltonian H for time t. Therefore, performing projective phase estimation on this operator will collapse the initial guess state $|\psi\rangle$ to an eigenstate of the Hamiltonian with a probability that depends on the initial overlap between the initial guess state $|\psi\rangle$ and the eigenstate of interest. If $H|n\rangle = E_n|n\rangle$ then performing phase estimation will project the system register to eigenstate $|n\rangle$, and readout the associated eigenvalue $E_n$, with probability $p_n = \langle\psi|n\rangle\langle n|\psi\rangle$. Therefore, the number of times that phase estimation must be repeated to prepare the eigenstate $|nz,29$ with high probability scales as $1/p_n$. For state preparation to be efficient, this probability is to decrease at most polynomially in the system size.

Figure 1:
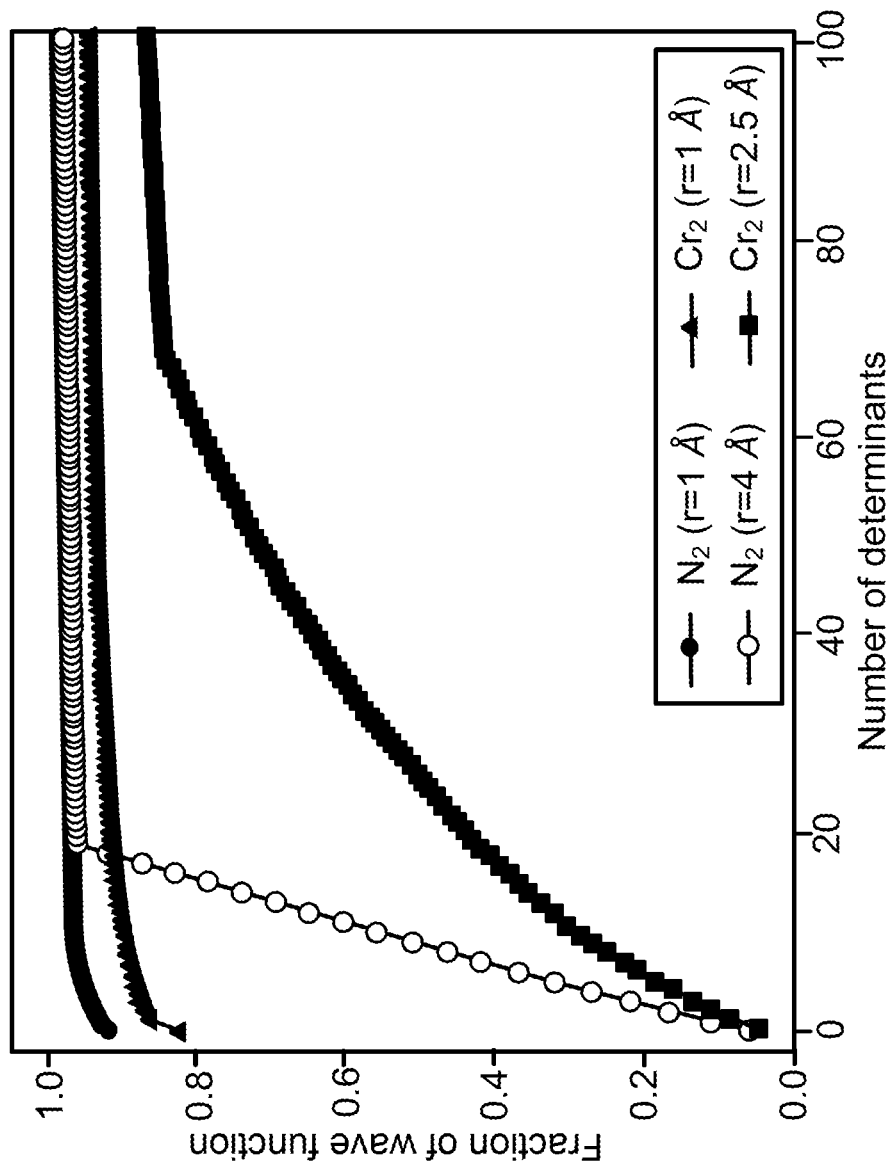
FIG. 1 is a plot showing the overlap of the ground state of Nitrogen and Chromium dimers as a function of the number of computational basis states used to prepare an initial superposition state.

Accordingly, it is important to prepare initial states $|\psi z,29$ for phase estimation with which the ground state has strong support, e.g., has an overlap that exceeds a predetermined threshold measured by the inner product. Preparing a single computational basis state as the initial state is straightforward but often a single computational basis state does not have strong support on the target eigenstate, and a superposition over a number of computational basis states provides a more suitable initial state. This is illustrated in FIG. 1, which shows the overlap of the ground state of Nitrogen and Chromium dimers as a function of the number of Slater determinants (computational basis states) used to prepare the initial superposition state. As shown in FIG. 1, there is a noticeable difference between starting in a wavefunction spanned by just one computational basis state and a wavefunction spanned by hundreds.

The present disclosure describes techniques for preparing an arbitrary superposition of computational basis states (also referred to herein as Slater determinants, as in the context of quantum chemistry) on a quantum computer. An example arbitrary superposition of L computational basis states is given by Equation (1) below.

$$|\psi_{in}\rangle = \sum_{l=1}^{L} \alpha_l |D_l\rangle \quad (1)$$

In Equation (1), $|D_l\rangle$ represents an l-th computational basis state with amplitude $\alpha_l$. In a first method, the quantum state given by Equation (1) is prepared in a compressed register of qubits and its state is mapped to a superposition of basis states. In a second method, the quantum state given by Equation (1) is prepared using two-dimensional rotations in the space of computational basis states. Both methods use unary iteration techniques, as described below in more detail.

Example Hardware

Figure 2:
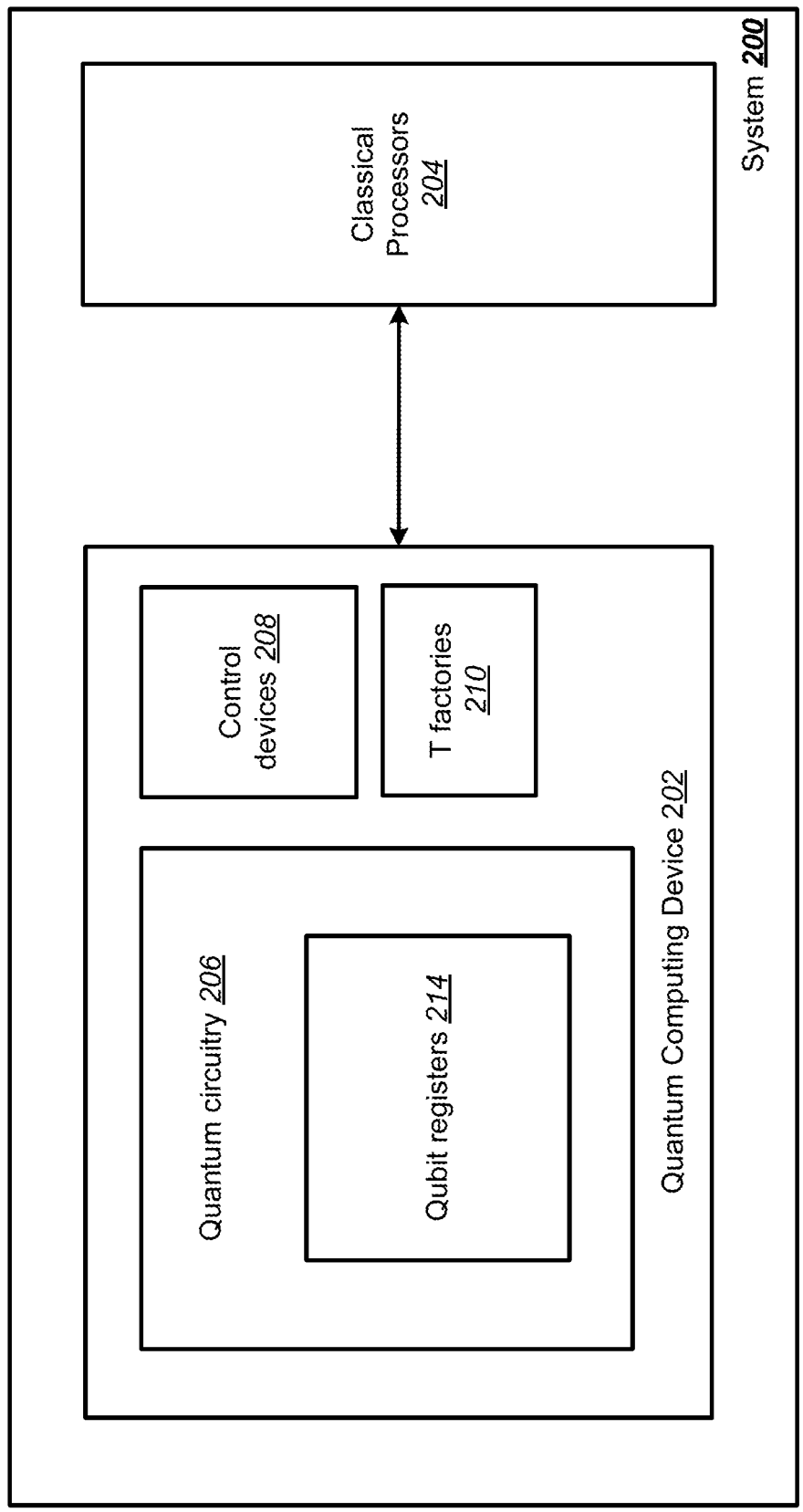
FIG. 2 depicts an example system.

FIG. 2 depicts an exemplary system 200 for preparing quantum states. The system 200 is an example of a system implemented as quantum or classical computer programs on one or more quantum computing devices or classical computers in one or more locations, in which the systems, components, and techniques described below can be implemented.

The system 200 includes a quantum computing device 202 in data communication with one or more classical processors 204. For convenience, the quantum computing device 202 and classical processors 204 are illustrated as separate entities, however in some implementations the one or more classical processors may be included in quantum computing device 202.

The quantum computing device 202 includes components for performing quantum computation. For example, the quantum computing device 202 includes quantum circuitry 206, control devices 208, and T factories 210. The quantum circuitry 206 includes components for performing quantum computations as sequences of quantum gates that implement transformations on qubits in one or more registers of qubits. For example, the quantum circuitry may include one or more quantum systems of multi-level quantum subsystems, e.g., registers of qubits 214. An example quantum circuit that may be implemented by the quantum computing device 202 is described below with reference to FIG. 4.

The type of multi-level quantum subsystems that the system 1200 utilizes may vary. For example, in some implementations the multi-level quantum subsystems may be superconducting qubits, e.g., Gmon or Xmon qubits. In some cases it may be convenient to include one or more resonators attached to one or more superconducting qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits comprising different quantum logic operations, e.g., single qubit gates, two qubit gates, and three qubit gates such as logical AND operations, may be constructed using the quantum circuitry 206. Constructed quantum circuits can be operated/implemented using the control devices 208. The type of control devices 208 included in the quantum system depend on the type of qubits included in the quantum computing device. For example, in some cases the control devices 208 may include devices that control the frequencies of qubits included in the quantum circuitry 206, an excitation pulse generator and control lines that couple the qubits to the excitation pulse generator. The control devices may then cause the frequency of each qubit to be adjusted towards or away from a quantum gate frequency of an excitation pulse on a corresponding control driveline. The control devices 208 may further include measurement devices, e.g., readout resonators. Measurement results obtained via measurement devices may be provided to the classical processors 204 for processing and analyzing. The control devices may further include devices that can stabilize the phase of Rabi oscillation. For example, by weakly coupling a qubit to a microwave cavity, the system can monitor the qubit state non-destructively. An output signal can be amplified by a nearly noiseless parametric amplifier and measured by a homodyne process. The measurement signal may then be mixed with a reference signal using an analog multiplier, which serves as the input of the signal generator used to control the qubit state.

The system 200 may be configured to prepare a quantum system included in the quantum computing device 202 in a particular superposition of an arbitrary number of computational basis states using the techniques described herein. Once the quantum system has been prepared in the particular state, it may be used by the system 200 to perform quantum computations or simulations.

Programming the Hardware: Preparing Superposition States Using a Compressed Register of Qubits FIG. 3 is a flow diagram of an example process 300 for preparing a quantum state of a quantum system register on a quantum computer, wherein the quantum state comprises a superposition of L computational basis states. In some implementations the superposition of L computational basis states may have been determined using an adaptive sampling configuration interaction method (as described in detail below). For brevity, the superposition of L basis states is referred to as a target quantum state $|\psi_{in}\rangle$ in the below description, where the target quantum state is given by Equation (1) above.

For convenience, the process 300 will be described as being performed by a system of one or more classical and quantum computing devices located in one or more locations. For example, a quantum computation system, e.g., the system 200 of FIG. 2, appropriately programmed in accordance with this specification, can perform the process 300.

The system prepares a register of log L qubits in an initial state that includes a weighted sum of register basis states (step 302). Since the register of qubits includes log L qubits, the register may be referred to as a "compressed" register of qubits. Each register basis state indexes a corresponding quantum state computational basis state. For example, in cases where L=8, the compressed register may include Log 8=3 qubits whose basis state $|000\rangle$ represents the computational basis state $|D_0\rangle$, $|001\rangle$ represents the computational basis state $|D_1\rangle$, $|010\rangle$ represents the computational basis state $|D_2\rangle$, $|011\rangle$ represents the computational basis state $|D_3\rangle$, etc.

The amplitude of each register basis state in the weighted sum of register basis states is equal to the amplitude of the corresponding computational basis state in the superposition of L computational basis states. That is, the system may prepare the compressed register of qubits in a state $|\phi\rangle$, where $|\phi\rangle$ can be given by Equation (2) below.

$$|\phi\rangle = \sum_{l=1}^{L} \alpha_l |l\rangle \quad (2)$$

In Equation (2), the amplitudes $\alpha_l$ are the same as in Equation (1) above and $|l\rangle$ represents a basis state of the compressed register that indexes the computational basis state $|D_l\rangle$ of Equation (1).

To prepare the compressed register in the initial state that corresponds to the target quantum state, the system may apply techniques for initializing quantum registers such as those described in "Synthesis of quantum-logic circuits," V. V. Shende et al, IEEE Transactions on Computer-Aided Design of Integrated Circuits and Systems 25, 1000 (2006). In some cases preparing the compressed register in the initial state may require O(L) quantum gates.

The system prepares the quantum state by implementing a unitary transformation that maps the basis states of the compressed register of log L qubits to the corresponding computational basis states (step 304). That is, the system implements a unitary transformation that maps $|l\rangle \rightarrow |D_l\rangle$ for all l=1, 2, . . . , L where the computational state $|D_l\rangle$ is specified by the quantum system register qubit occupation numbers $d_{l,1}$, $d_{l,2}$, . . . $d_{l,N}$ with N representing quantum system size.

In some implementations, the system may implement the unitary transformation by application of a unary iteration quantum circuit. An example unary iteration quantum circuit is described below with reference to FIG. 4. Applying the unitary iteration quantum circuit includes streaming over the quantum system register and storing the results in a unary register. The state of the unary register is determined by the register of log L qubits—the state of the unary register is $|1\rangle$ if the state of the quantum system register equals a selected basis state and is otherwise $|0\rangle$. Performing indexed operations, e.g., data loading, using a unary iteration quantum circuit is described below with reference to FIG. 5. The compressed register of qubits can be mapped directly onto an index register of a unary iteration quantum circuit, making the method particularly suited to implementations using unary iteration quantum circuits.

To implement the unitary transformation, the system controls, sequentially for each index 1 to L and by the register of log L qubits, a transformation of the quantum system register state for the index to the corresponding computational basis state for the index. That is, for an l-th index, the system applies a unitary $U_l = \Pi_{k=1}^{N} X_k^{d_{l,k}}$ to the quantum system register controlled by the unary register, where X represents a Pauli X operator. This unitary only affects the state $|1\rangle$ of the compressed register, and the corresponding computational basis state is read to the quantum system register. Equation (3) gives an example mapping produced by this operation.

$$|l\rangle|0\rangle \rightarrow |l\rangle|D_l\rangle \quad (3)$$

This step requires O(NL) Clifford gates to implement and O(L) T gates.

The system may then erase the state of the compressed register using a unitary, e.g., a product of Pauli-X operators, controlled by the unary register. Equation (4) gives an example mapping produced by this operation.

$$|l\rangle|D_l\rangle \rightarrow |0\rangle|D_l\rangle \quad (4)$$

This step requires an additional O(log L) Clifford gates and zero T gates to implement in each step l=1 to L of unary iteration.

The system may then uncompute the unary register using the same data streaming method on the system register for the state $|D_l\rangle$.

The total cost to prepare the quantum state is therefore O(NL+L log L) Clifford gates and O(L) T gates.

In other implementations the system may prepare the quantum state by implementing the unitary transformation using a select unitary method. Select unitary methods are described in "Toward the first quantum simulation with quantum speedup," Childs et al, PNAS, Sep. 18, 2018 115 (38) 9456-9461.

In some implementations the system may provide the prepared quantum state for use in a quantum phase estimation algorithm. In other implementations the system may initialize a quantum simulation using the prepared target quantum state. For example, the system may perform a quantum simulation using the prepared quantum state as an initial state to determine properties of a physical system. For example, the system may perform a quantum simulation to determine properties of a chemical, e.g., a rate of a chemical reaction, as part of a drug discovery process. As another example, the system may perform a quantum simulation to determine properties of a material, e.g., the conductivity of a semiconductor, as part of a design and manufacturing process.

Example Unary Iteration Quantum Circuit Construction

Figure 4:
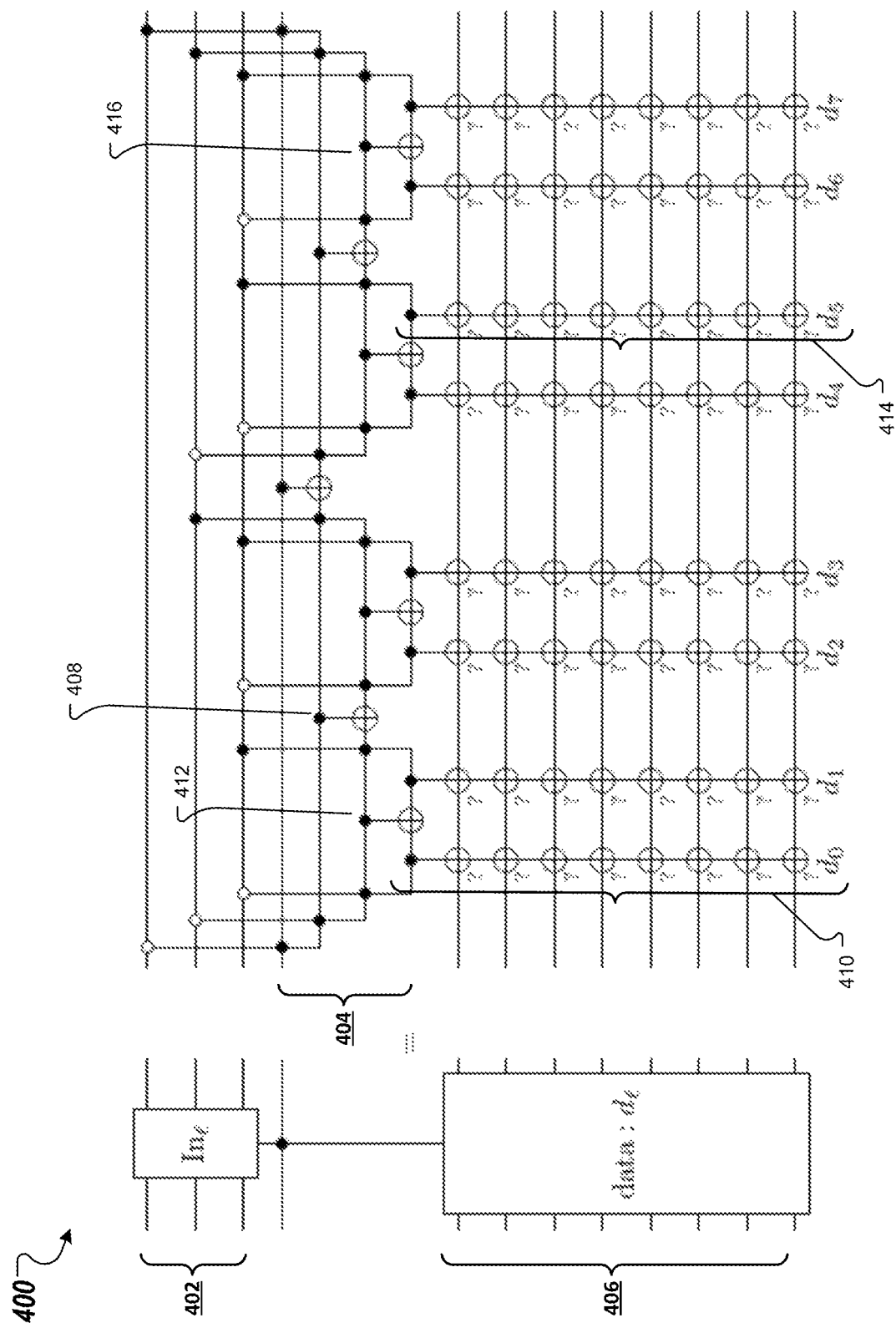
FIG. 4 shows an example unary iteration quantum circuit.

FIG. 4 shows an example unary iteration quantum circuit 400. For convenience, the example unary iteration quantum circuit 400 is illustrated as being configured for reading 8 data items $d_0$-$d_7$, e.g., data items representing superposition state amplitudes. However, in some cases the circuit may be expanded (or reduced) and configured to load an arbitrary number of data items, e.g., for preparing arbitrary superposition states.

The example unary iteration quantum circuit 400 includes an index register 402 including thee index qubits. The upper most index qubit represents the most significant bit, and the lowest index qubit represents the least significant bit. The index register 402 is configured to store an index value. The index value, as described with reference to FIG. 3, may correspond to a computational basis state. For example, the index value 011 may correspond to a third computational basis state $|D_3\rangle$.

The example unary iteration quantum circuit 400 includes a control register 404 including four control qubits. In this description, the lowest control qubit is referred to as the final control qubit. The example unary iteration quantum circuit 400 also includes a data register 406 including eight data qubits. This data register corresponds to the computational basis states of the superposition state that is to be prepared.

The control register 404 encodes the index value encoded in the index register 402 via an iterative cascade of multiple logical AND operations performed between respective pairs of control qubits and index qubits, where each control qubit is made available to the cascade of operations in sequence and not in parallel. At the end of the iterative cascade, the result of a logical AND operation between an inverse of the index qubit representing the least significant bit and the penultimate control qubit storing a result of a previous logical AND operation is stored in the final control qubit.

The example unary iteration quantum circuit 400 repeatedly computes and uncomputes the control qubits to load a data item, e.g., one of data items $d_0$–$d_7$, corresponding to the index value to the data register of data qubits. In between each repetition, a CNOT operation is performed between the last uncomputed control qubit and the next most highest control qubit, with the next most highest control qubit acting as the control. For example, between repetition 1 and repetition 2, a CNOT gate 408 is performed between the third control qubit and the second control qubit, with the second control qubit acting as the control. Between repetition 2 and 3, a CNOT gate is performed between the second control qubit and the first control qubit, with the first control qubit acting as the control.

The number of repetitions included in a data loading quantum circuit depends on the number of distinct data loading operations and/or the number of index qubits in the index register. For example, the example unary iteration quantum circuit 400 includes three index qubits and eight distinct data loading operations. Therefore, in this case, the number of compute/uncompute repetitions is equal to 4.

A repetition of computing and uncomputing the control qubits includes iteratively computing one or more logical AND operations between pairs of control and index qubits to store a result of the computations in the final control qubit. If the final control qubit is in an ON state, a multi target CNOT operation is performed on the data register qubits with the final control qubit acting as a control for the multi target CNOT operation. The multi target CNOT operation is dependent on a binary encoding of the data item. For example, if the data item has a binary representation of 10000001, the multi target CNOT operation may include a multi target CNOT operation controlled by the final control qubit that targets the qubits in the data register at offset 0 and 7, i.e., applies CNOTs to the first and the last qubit in the data register. As another example, if the data item has a binary representation of 00001111, the multi target CNOT operation may include a multi target CNOT operation controlled by the final control qubit that targets the last four qubits in the data register.

A CNOT operation is then performed between the final control qubit and the penultimate control qubit, where the penultimate control qubit acts as the control for the CNOT operation. Then, if the final control qubit is in an ON state, a multi target CNOT operation is performed on the data register qubits, again where the multi target CNOT operation is dependent on a binary encoding of the data item. Pairs of control and index qubits are then iteratively uncomputed.

The number of iterative computations and uncomputations performed in a repetition depends which repetition is being performed.

The unary iteration quantum circuit 400 ends by uncomputing the iteratively computed cascade of logical AND operations using a second cascade of uncomputations. Each control qubit is made available to the cascade of uncomputations in sequence and not in parallel.

The above described unary iteration quantum circuit 400 and variations thereof can be used to construct a "read only" type of QRAM, referred to as QROM. A QROM can read classical data indexed by a quantum register using a data loading quantum circuit, i.e. perform the example transformation given below in Equation (5), $$QROM_d \cdot \sum_{l=0}^{L-1} a_l |l\rangle|0\rangle = \sum_{l=0}^{L-1} a_l |l\rangle|D_l\rangle \quad (5)$$

In Equation (5), l represents an index to be read and $d_l$ represents a word at offset l in a classical list d containing L words (items of data), with each word consisting of D bits, and $\alpha_i$ are arbitrary amplitudes. The left hand side of Equation (3) describes an arbitrary superposition over the index register's L possible values with a second register in the state $|0\rangle$ and the left-multiplication of $QROM_d$ indicates the application of the QROM circuit. The right hand side of Equation (5) describes the state resulting from the application of the QROM circuit which has the data bits $d_l$ in the second register entangled with each possible computational basis state of the first register.

The quantum circuit 400 (and therefore the QROM construction) has a gate complexity of O(L D), since each of the D bits in each of the L words or data items from the QROM determines whether or not a CNOT gate is present and it is possible that all of the QROM's bits are set. However, because the CNOT is a Clifford operation, it is cheap to apply. This is especially so for multi-target CNOT operations, which can be combined into a single braiding operation in the surface code. The T-count of the circuit comes entirely from the unary iteration process (and is independent of data item size) whose T-count is upper bounded by 4L-4.

Furthermore, since the T count is independent of data item size, the data item size can be (artificially) increased without affecting the T count by reading $d_l'$=concat($d_{2l}$, $d_{2l+1}$) instead of $d_l$. This changes the T-count from 4L to 2L+4D, which is beneficial as long as D is less than L/2.

Example Method for Performing Data Loadings

Figure 5:
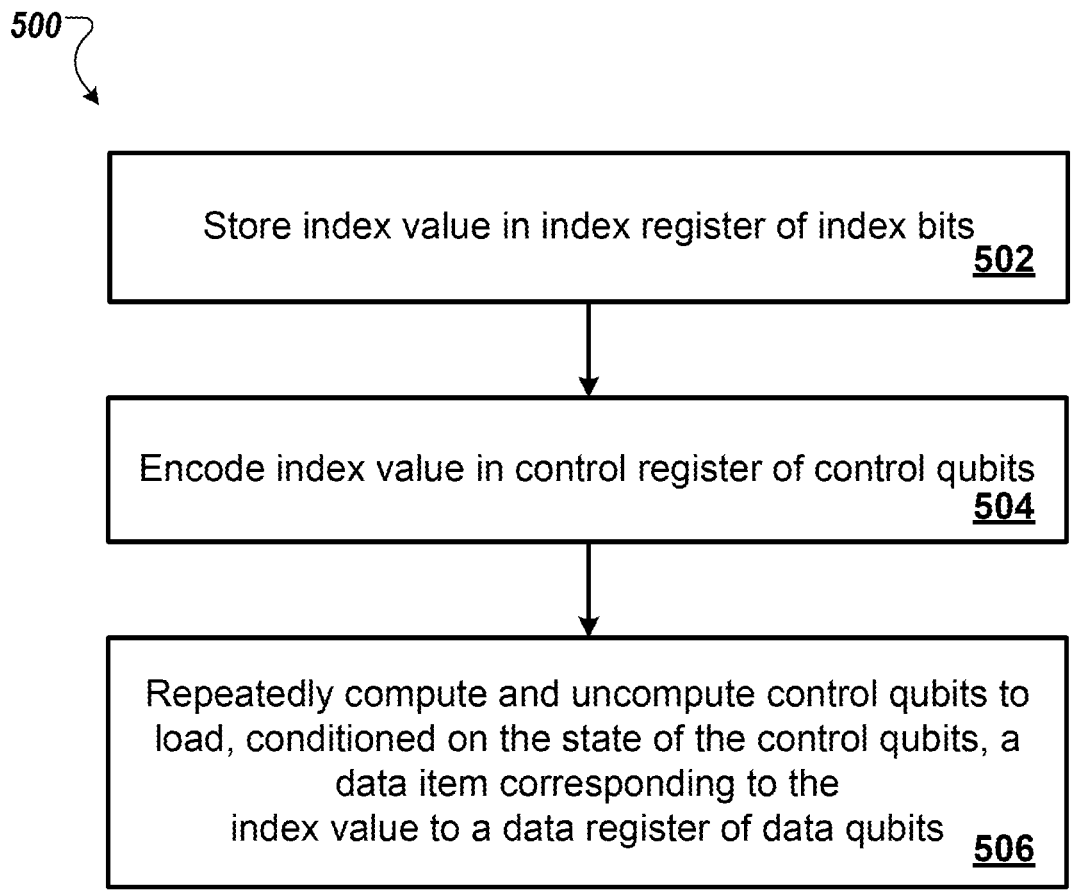
FIG. 5 is a flowchart of an example process for loading data using unary iteration techniques

FIG. 5 is a flowchart of an example process 500 for loading data using unary iteration techniques. For convenience, the process 500 will be described as being performed by a quantum computing device in communication with one or more classical computing devices located in one or more locations. For example, the system 200 of FIG. 2, appropriately programmed in accordance with this specification, can perform the process 500.

The system encodes an index value in an index register comprising one or more index qubits (step 502), wherein the index value may be obtained through the process of some larger quantum computation. For example, as illustrated above with reference to FIG. 4, the system may include an index register with N qubits and encode an index value l with $0 \leq l < 2^{N-1}$. In some cases the index register may not encode an out-of-range value $l \geq 2^{N-1}$.

The system encodes the index value in a control register comprising multiple control qubits (step 504). Encoding the index value in the control register may include iteratively computing multiple logical AND operations between respective pairs of control qubits and index qubits to store a result of a logical AND operation between an inverse of a least significant index qubit and a penultimate control qubit storing a result of a previous logical AND operation in a final control qubit.

The system repeatedly computes and uncomputes the control qubits to load, conditioned on the state of the control qubits, a data item corresponding to the index value to a data register of data qubits (step 506). Computing and uncomputing one or more control qubits may include repeatedly:

a) determining whether the final control qubit is in an ON state, and in response to determining that the final control qubit is in an ON state, performing a multi target CNOT operation on the data register qubits, wherein the multi target CNOT operation is dependent on a binary encoding of the data item and the final control qubit acts as the control for the multi target CNOT operation;

b) determining a number of uncomputations of the iteratively computed logical AND operations described with reference to step 904 to perform;

c) performing the determined number of uncomputations;

d) performing a CNOT operation between a control qubit corresponding to the last uncomputed logical AND operation and a next highest control qubit, wherein the next highest control qubit acts as a control for the CNOT operation;

e) iteratively computing a number of logical AND operations as described above with reference to step 904 to recompute the final control qubit.

Determining a number of uncomputations of the iteratively computed logical AND operations to perform includes determining how many bits are flipped when changing the binary representation of an index value corresponding to a final control qubit to the next (or, equivalently, the number of times it is possible to divide the index value in base 10 by 2 before the result becomes a non-integer). The number of uncomputations to perform is then equal to the determined number of required bit flips minus 1. Alternatively, the number of uncomputations to perform is equal to the number of times the value of the next index value can be divided by 2 before a non-integer result is obtained.

For example, for a first repetition, a multi target CNOT operation 410 is performed on the data register qubits 406 if the final control qubit is in an ON state, with the multi target CNOT operation 410 being dependent on a binary encoding of the data item do and the final control qubit acting as the control for the multi target CNOT operation 410. No uncomputations are then performed. A CNOT operation 412 is then performed between the final control qubit and a penultimate control qubit. No logical AND operations are then performed.

As another example, for a sixth repetition, a multi target CNOT operation 414 is performed on the data register qubits 406 if the final control qubit is in an ON state, with the multi target CNOT operation 414 being dependent on a binary encoding of the data item $d_5$ and the final control qubit acting as the control for the multi target CNOT operation 414. One uncomputation is then performed. A CNOT operation 416 is then performed between the penultimate control qubit and a next highest control qubit. One logical AND operation is then performed.

In some implementations, the system may further uncompute the iteratively computed multiple logical AND operations between respective pairs of control qubits and index qubits, as described above with reference to step 502, to reset the index register to encode the index value.

Figure 6:
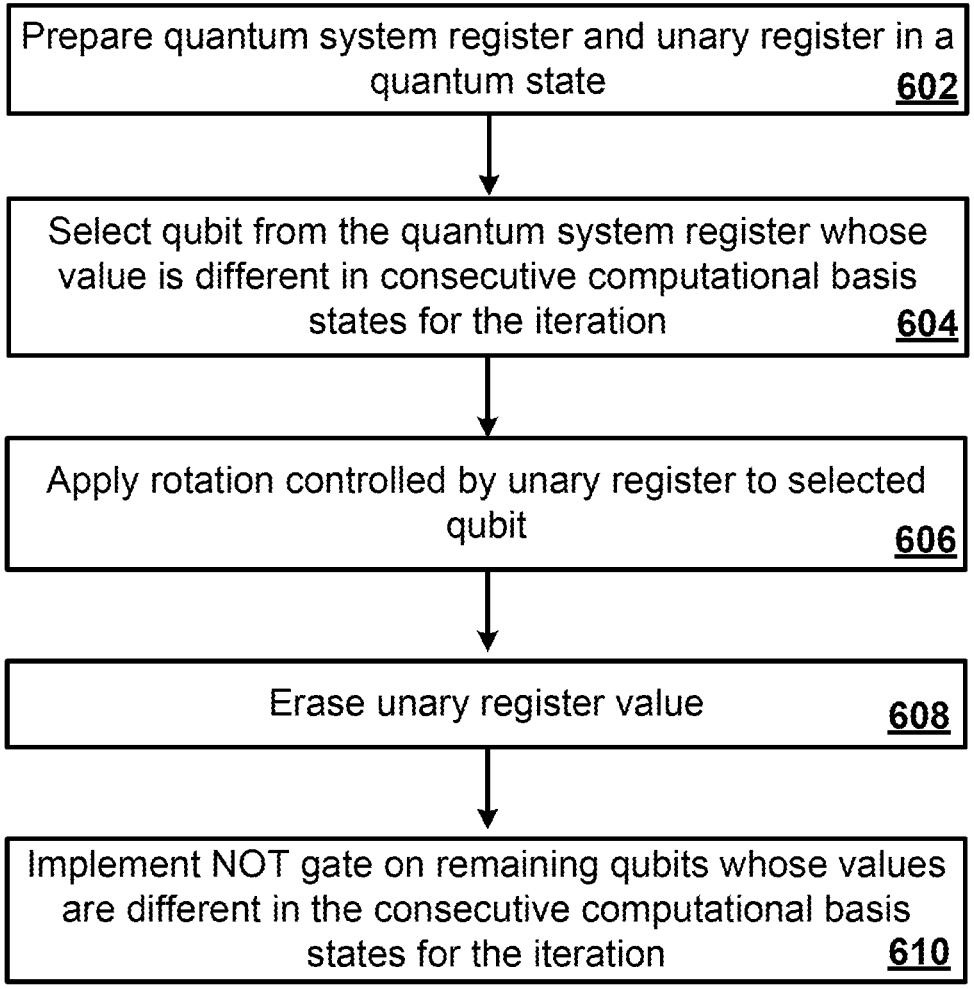
FIG. 6 is a flow diagram of an example process for preparing a superposition of basis states using two-dimensional rotations in the space of computational basis states.

Programming the Hardware: Preparing Superposition States Using Two-Dimensional Rotations in the Space of Computational Basis States FIG. 6 is a flow diagram of an example process 600 for preparing a quantum state of a quantum system register on a quantum computer, wherein the target quantum state comprises a superposition of L computational basis states. In some implementations the superposition of L computational basis states may have been determined using an adaptive sampling configuration interaction method.

For convenience, the process 600 will be described as being performed by a system of one or more classical or quantum computing devices located in one or more locations. For example, a quantum computation system, e.g., the system 200 of FIG. 2, appropriately programmed in accordance with this specification, can perform the process 600.

The example process 600 proceeds in sequence for each index l=1 to l=L. For each index, the system prepares the quantum system register and a unary register in a quantum state given by Equation (6) below (step 602).

$$|\psi_l z, 29 = \beta_l |D_l\rangle |1\rangle + \Sigma_{l'=1}^{l-1} \alpha_{l'} |D_{l'}\rangle |0z, 29 . \qquad (6)$$

In Equation (6), l represents the index, $|D_l\rangle$ represents the l-th computational basis state, $\alpha_j$ represents the amplitude of the j-th computational basis state, and $$|\beta_l| = \sqrt{1 - \sum_{l'=1}^{l-1} |a_{l'}|^2}$$

can be derived from normalization.

The system selects a qubit k from the quantum system register whose value is different in $|D_l\rangle$ and $|D_{l+1}\rangle$ (step 604). That is, the system selects a qubit from the quantum system whose occupation numbers $d_{l,k}$ and $d_{l+1,k}$ are different.

The system applies a rotation to the selected qubit (step 606), wherein the rotation is controlled by the state of a unary register. For example, the system maps $$\beta_l |D_l\rangle |1\rangle \rightarrow (\alpha_l |D_l\rangle + \beta_{l+1} X_k |D_l\rangle) |1\rangle \qquad (7)$$

where $X_k$ represents a Pauli X gate operating on qubit k.

The system erases the unary register value for $|D_l\rangle$ (step 608). Equation (8) gives an example mapping produced by this operation.

$$|D_l\rangle |1\rangle \rightarrow |D_l\rangle |0\rangle \qquad (8)$$

Erasing the unary register requires O(N) Clifford gates and O(1) T gates.

The system implements a NOT logic gate on the remaining qubits whose values are different in $|D_l\rangle$ and $|D_{l+1}\rangle$, wherein implementation of the NOT logic gate is controlled by the state of the unary register (step 610). For example, by implementing the NOT gates in this manner, the system can perform the example mapping given below by Equation (9).

$$\beta_l |D_l\rangle |1\rangle \rightarrow \alpha_l |D_l\rangle |0z, 900 + \beta_{l+1} |D_{l+1}\rangle |1\rangle \qquad (9)$$

By combining the above mappings, the system maps the state $|\psi\rangle$ defined in step 602 to the state $|\psi_{l+1}\rangle$ for the next iteration.

The process 600 requires O(NL) Clifford gates and O(L) T gates. In some implementations the system may further order the computational basis states such that the Hamming distances between neighboring computational basis states are reduced. Ordering the computational basis states in this manner can reduce the total number of gates required to perform the process 600.

In some implementations the system may provide the prepared quantum state for use in a quantum phase estimation algorithm. In other implementations the system may initialize a quantum simulation using the prepared target quantum state. For example, the system may perform a quantum simulation using the prepared quantum state as an initial state to determine properties of a physical system. For example, the system may perform a quantum simulation to determine properties of a chemical, e.g., a rate of a chemical reaction, as part of a drug discovery process. As another example, the system may perform a quantum simulation to determine properties of a material, e.g., the conductivity of a semiconductor, as part of a design and manufacturing process.

Adaptive Sampling Configuration Interaction Method

The Adaptive Sampling Configuration Interaction (ASCI) method performs a diagonalization on a determinant space in which as many important degrees of freedom as possible is captured. This principle motivates most exact diagonalization and configuration interaction (CI) techniques, but most methods do not allow for explicit searching for important determinants. In contrast with some CI techniques, the idea of using a selected CI approach is to generate a relatively small set of determinants that account for 90% or more of the top contributions to the full CI wavefunction.

In selected CI methods, a wavefunction $\psi_k$ is iteratively improved to reach a desired accuracy, beginning with a single determinant approximation. The search part of the algorithm has two rules: a selection criterion to determine what part of Hilbert space to search for new determinants (pruning) and a ranking criterion to determine the best determinants to include in the improved wavefunction $\psi_{k+1}$.

For the applications considered in this specification, the ranking criterion can be derived from a consistency relation among the coefficients of determinants in the eigenstate approximation. Expressing the time-independent Schrödinger equation $H|\psi\rangle = E|\psi\rangle$ in the basis of determinants so that $|\psi\rangle = \Sigma_i C_i |D_i\rangle$, where $|D_i\rangle$ represents the ith determinant, Equation (10) can be obtained $$C_i = \frac{\sum_{i \neq j} H_{ij} C_j}{E - H_{ii}} \quad (10)$$

where $H_{ij} = \langle D_i | H | D_j \rangle$ represents the Hamiltonian matrix element between the ith and jth determinants. Equation (10) can be used to predict a new and better set of determinants by taking the left hand side as an estimate of the magnitude of the expansion coefficients, as given in Equation (11):

$$C_i^{k+1} = \frac{\sum_{i \neq j} H_{ij} C_j^k}{E_k - H_{ii}} \quad (11)$$

where $E_k = \langle \psi_k | H | \psi_k \rangle$ represents the energy of the wavefunction in the kth iteration. For coefficients corresponding to an exact eigenstate of H, $C_i^{k+1} = C_i^k$. Since the goal of selected CI is to include the most important weight determinants in the expansion, this equation can be used to rank the determinants by magnitude of $C_i^{k+1}$. These coefficients are related to a first-order perturbation estimate for CI coefficients in many body perturbation theory.

In practice this iterative approach generates all the top contributions to the wavefunction. Having the top contributions is important to obtain highly accurate energies, as can be seen by combining the ASCI method with second order many body perturbation theory.

Figure 7:
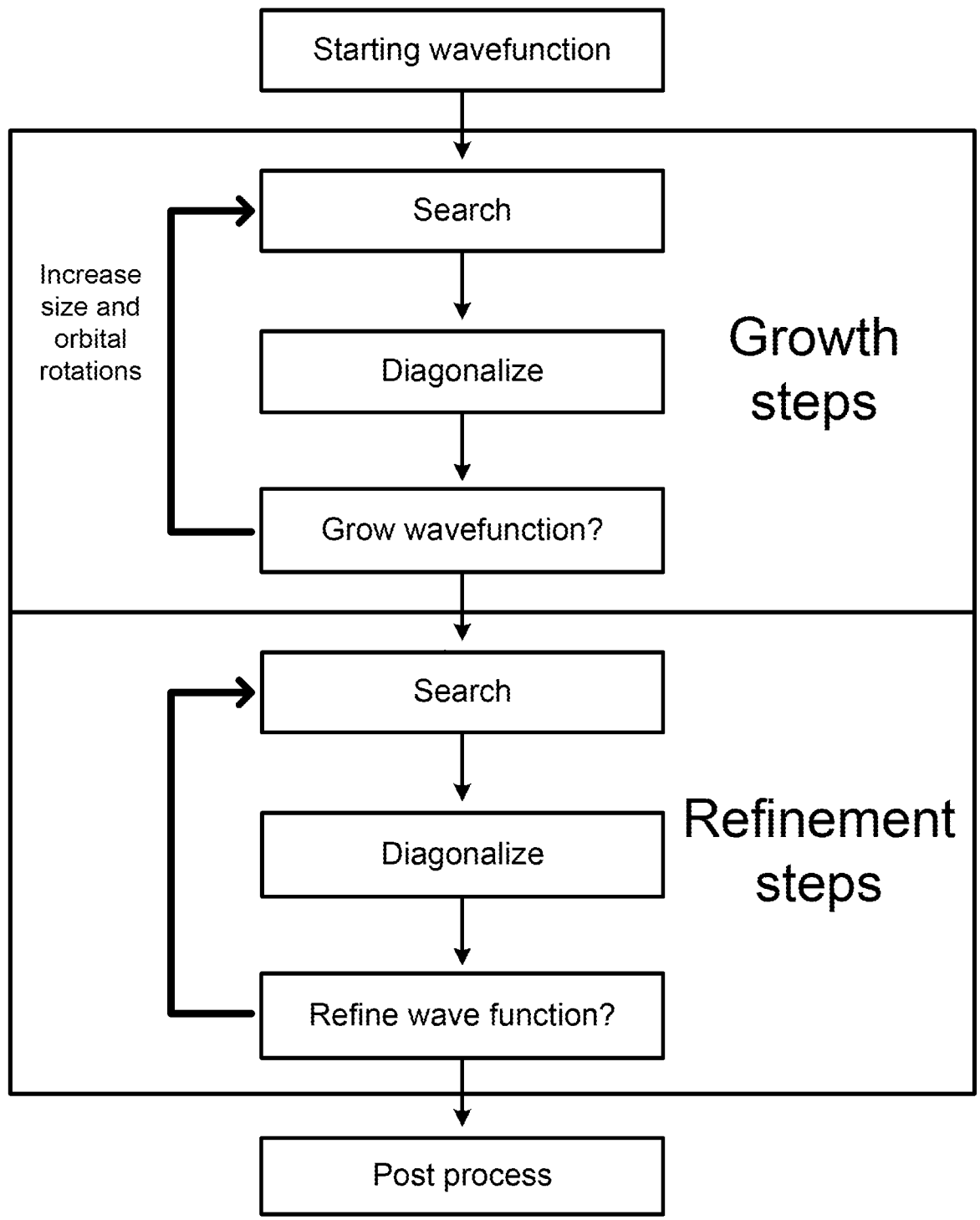
FIG. 7 is a flow diagram of an example Adaptive Sampling Configuration Interaction algorithm.

FIG. 7 is a flow diagram of an example ASCI algorithm. The computational parts include search, diagonalization, and post-processing steps. The growth steps are performed in the first set of iterations of ASCI to bring the variational wavefunction from the Hartree-Fock determinant to a wavefunction of size $N_{tdets}$. The wavefunction is grown, since it is slower to perform diagonalizations on a full size but inaccurate wavefunction. The refinement steps can be used when a very high accurate variational wavefunction is to be generated. During the refinement step the size of the wavefunction can be fixed but it is continually improved upon through search/diagonalization iterations.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for preparing a quantum state of a quantum system register on a quantum computer, wherein the quantum state comprises a superposition of L computational basis states, the method comprising:
    preparing a register of log L qubits in an initial state, the initial state comprising a weighted sum of register basis states, wherein:
        each register basis state indexes a corresponding quantum state computational basis state, and
        an amplitude of each register basis state in the weighted sum of register basis states is equal to the amplitude of the corresponding computational basis state in the superposition of L computational basis states; and
    preparing the quantum state by implementing a unitary transformation that maps the register basis states to the corresponding L computational basis states, comprising, for each index 1 to L;
    controlling, by the register of log L qubits, transformation of the quantum system register state for the index to the corresponding computational basis state for the index, comprising:
        applying a unitary operator for the index to the quantum system register state controlled by a state of a unary register, wherein the state of the unary register is determined by the register of log L qubits, to read the computational basis state corresponding to the index to the quantum system register,
        erasing the state of the register of log L qubits using a unitary operator controlled by the unary register to put the register of log L qubits in a zero state; and
        un-computing the unary register.

2. The method of claim 1, wherein applying a unitary operator for the index to the quantum system register state controlled by a state of a unary register, wherein the state of the unary register is determined by the register of log L qubits, to read the computational basis state corresponding to the index to the quantum system register comprises implementing a unary iteration quantum circuit.

3. The method of claim 1, further comprising providing the register of log L qubits for use in further computations.

4. The method of claim 1, wherein applying the unitary operator for the index to the quantum system register state controlled by the state of the unary register that is determined by the register of log L qubits comprises controlling applications of products of Pauli-X quantum logic gates.

5. The method of claim 1, wherein implementing a unitary transformation that maps the register basis states to the corresponding L computational basis states comprises applying select unitary methods.

6. The method of claim 1, wherein preparing the register of log L qubits in the initial state comprises applying quantum circuit synthesis techniques.

7. The method of claim 1, wherein the superposition of L computational basis states is determined using an adaptive sampling configuration interaction method.

8. The method of claim 1, further comprising providing the quantum state for use in a quantum phase estimation algorithm.

9. The method of claim 1, further comprising:
    performing a quantum simulation using the prepared quantum state as an initial state of the quantum simulation.

10. The method of claim 1, wherein the quantum computer comprises a circuit model quantum computer.

11. An apparatus comprising:
    quantum hardware; and
    one or more classical processors;
    wherein the apparatus is configured to perform operations for preparing a quantum state of a quantum system register on a quantum computer, wherein the quantum state comprises a superposition of L computational basis states, the operations comprising:
        preparing a register of log L qubits in an initial state, the initial state comprising a weighted sum of register basis states, wherein:
            each register basis state indexes a corresponding quantum state computational basis state, and
            an amplitude of each register basis state in the weighted sum of register basis states is equal to the amplitude of the corresponding computational basis state in the superposition of L computational basis states; and
        preparing the quantum state by implementing a unitary transformation that maps the register basis states to the corresponding L computational basis states, comprising, for each index 1 to L;
        controlling, by the register of log L qubits, transformation of the quantum system register state for the index to the corresponding computational basis state for the index, comprising:
            applying a unitary operator for the index to the quantum system register state controlled by a state of a unary register, wherein the state of the unary register is determined by the register of log L qubits, to read the computational basis state corresponding to the index to the quantum system register, erasing the state of the register of log L qubits using a unitary operator controlled by the unary register to put the register of log L qubits in a zero state; and un-computing the unary register.

12. The apparatus of claim 11, wherein the quantum hardware comprises:
a quantum circuit comprising:
a quantum system register comprising multiple target qubits;
an index register comprising log L index qubits;
a control register comprising multiple control qubits;
one or more control devices configured to operate the quantum circuit.

13. A method for preparing a target quantum state of a quantum system register on a quantum computer, wherein the target quantum state comprises a superposition of L computational basis states, the method comprising, sequentially for each index l=1 to l=L:
preparing the quantum system register and a unary register in a quantum state, wherein:
the state of the quantum system register is entangled with the unary register,
at an initial time step the state of the quantum system register equals the target quantum state up to the first (l−1) computational basis states if the state of the unary register is |0⟩, and
the state of the quantum system register equals a l-th computational basis state if the unary register is in state |1⟩;
selecting a qubit from the quantum system register whose value is different in the l-th computational basis state and a l+1-th computational basis state;
applying a rotation to the selected qubit, wherein the rotation is controlled by the state of a unary register;
erasing the unary register value for the l-th computational basis state; and
implementing a NOT logic gate on the remaining qubits in the quantum system register whose values are different in the l-th computational basis state and the l+1-th computational basis state, wherein implementation of the NOT logic gate is controlled by the state of the unary register.

14. The method of claim 13, wherein preparing the quantum system register and a see tiff unary register in a quantum state comprises preparing the quantum system register and unary for register in a quantum state $|\psi_l\rangle = \beta_l|D_l\rangle|1\rangle + \Sigma_{l'=1}^{l-1}\alpha_{l'}|D_{l'}\rangle|0\rangle$, wherein l represents the index, $|D_l\rangle$ represents the l-th computational basis state, α represents a computational basis state amplitude, and $|\beta_l| = \sqrt{1 - \Sigma_{l'=1}^{l-1}|\alpha_{l'}|^2}$.

15. The method of claim 13, further comprising ordering the computational basis states such that Hamming distances between neighboring computational basis states are reduced.

16. The method of claim 13, wherein applying a rotation to the selected qubit comprises applying a Pauli X gate to the selected qubit.

17. The method of claim 13, wherein selecting a qubit from the quantum system register whose value is different the l-th computational basis state and the l+1-th computational basis state comprises selecting a qubit from the quantum system whose occupation numbers $d_{l,k}$ and $d_{l+1,k}$ are different.

18. The method of claim 13, wherein an amplitude of the l-th basis state is derived from normalization.

19. The method of claim 14, wherein $|\beta_l|$, is derived from normalization.

20. The method of claim 13, wherein the superposition of L computational basis states is determined using an adaptive sampling configuration interaction method.

21. The method of claim 13, further comprising providing the target quantum state for use in a quantum phase estimation algorithm.

22. The method of claim 13, further comprising:
initializing a quantum simulation using the prepared target quantum state; and
performing a the quantum simulation.

23. An apparatus comprising:
quantum hardware; and
one or more classical processors;
wherein the apparatus is configured to perform operations for preparing a target quantum state of a quantum system register on a quantum computer, wherein the target quantum state comprises a superposition of L computational basis states, the operations comprising, sequentially for each index l=1 to l=L:
preparing the quantum system register and a unary register in a quantum state, wherein:
the state of the quantum system register is entangled with the unary register,
at an initial time step the state of the quantum system register equals the target quantum state up to the first (l−1) computational basis states if the state of the unary register is |0⟩, and
the state of the quantum system register equals a l-th computational basis state if the unary register is in state |1⟩;
selecting a qubit from the quantum system register whose value is different in the l-th computational basis state and the l+1-th computational basis state;
applying a rotation to the selected qubit, wherein the rotation is controlled by the state of a unary register;
erasing the unary register value for the l-th computational basis state; and
implementing a NOT logic gate on the remaining qubits in the quantum system register whose values are different in the l-th computational basis state and the l+1-th computational basis state, wherein implementation of the NOT logic gate is controlled by the state of the unary register.

24. The apparatus of claim 23, wherein the quantum hardware comprises:
a quantum circuit comprising:
a quantum system register comprising multiple target qubits;
a unary register comprising multiple control qubits; and
one or more control devices configured to operate the quantum.

* * * * *